(12) United States Patent
Saha et al.

(10) Patent No.: US 10,981,196 B2
(45) Date of Patent: Apr. 20, 2021

(54) METHOD OF PROTECTING AN ARTICLE HAVING A COMPLEX SHAPE

(71) Applicant: General Electric Company, Schenectady, NY (US)

(72) Inventors: Atanu Saha, Bangalore (IN); Gopi Chandran Ramachandran, Bangalore (IN); Mamatha Nagesh, Bangalore (IN); Shalini Thimmegowda, Bangalore (IN); Bala Srinivasan Parthasarathy, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/533,829

(22) PCT Filed: Dec. 1, 2015

(86) PCT No.: PCT/US2015/063115
§ 371 (c)(1),
(2) Date: Jun. 7, 2017

(87) PCT Pub. No.: WO2016/094118
PCT Pub. Date: Jun. 16, 2016

(65) Prior Publication Data
US 2017/0326587 A1    Nov. 16, 2017

(30) Foreign Application Priority Data

Dec. 8, 2014   (IN) .......................... 6188/CHE/2014

(51) Int. Cl.
| | | |
|---|---|---|
| *B05D 7/00* | (2006.01) |
| *B05D 7/14* | (2006.01) |
| *B32B 25/20* | (2006.01) |
| *C09D 183/04* | (2006.01) |
| *F04D 7/04* | (2006.01) |
| *F04D 29/40* | (2006.01) |
| *B05D 1/02* | (2006.01) |
| *B05D 1/18* | (2006.01) |
| *F04D 17/00* | (2006.01) |
| *B63H 5/16* | (2006.01) |
| *F04D 29/043* | (2006.01) |
| *F04D 29/053* | (2006.01) |
| *F04D 29/42* | (2006.01) |
| *F04D 29/52* | (2006.01) |
| *C08G 77/12* | (2006.01) |
| *C08G 77/20* | (2006.01) |

(52) U.S. Cl.
CPC .............. *B05D 7/546* (2013.01); *B05D 1/02* (2013.01); *B05D 1/18* (2013.01); *B05D 7/14* (2013.01); *B32B 25/20* (2013.01); *C09D 183/04* (2013.01); *F04D 7/04* (2013.01); *F04D 29/403* (2013.01); *B05D 2202/00* (2013.01); *B32B 2250/02* (2013.01); *B32B 2250/248* (2013.01); *B32B 2383/00* (2013.01); *B63H 5/165* (2013.01); *C08G 77/12* (2013.01); *C08G 77/20* (2013.01); *F04D 17/00* (2013.01); *F04D 29/043* (2013.01); *F04D 29/053* (2013.01); *F04D 29/4206* (2013.01); *F04D 29/522* (2013.01); *F05D 2300/437* (2013.01); *F05D 2300/611* (2013.01)

(58) Field of Classification Search
None
See application file for complete search history.

(56) References Cited

U.S. PATENT DOCUMENTS

| | | |
|---|---|---|
| 3,320,115 A | 5/1967 | Reid et al. |
| 3,877,970 A | 4/1975 | Edmonds, Jr. et al. |
| 4,341,842 A | 7/1982 | Lampe |
| 4,396,658 A | 8/1983 | Mettes et al. |
| 4,817,856 A | 4/1989 | Koistinen et al. |

(Continued)

FOREIGN PATENT DOCUMENTS

| | | |
|---|---|---|
| CA | 1 309 547 C | 10/1992 |
| EP | 0 220 804 A1 | 5/1987 |

(Continued)

OTHER PUBLICATIONS

"Technical Data Sheet SS4044P Primer Momentive," pp. 1-6, retrieved from https://www.momentive.com/products/showtechnicaldatasheet.aspx?id=10371, retrieved on Feb. 12, 2016.
"Technical Data Sheet Silopren* LSR2050," pp. 1-4, retrieved from https://www.momentive.com/products/showtechnicaldatasheet.aspx?id=15837, retrieved on Feb. 12, 2016.
"Technical Data Sheet Silopren* LSR Topcoat TP 3719," pp. 1-4, retrieved from https://www.momentive.com/products/showtechnicaldatasheet.aspx?id=25367, retrieved on Feb. 12, 2016.
Ansari, R. and Alikhani, A.H., "Application of polyaniline/nylon composites coating for corrosion protection of steel," Journal of Coatings Technology and Research, vol. 6, Issue 2, pp. 221-227 (Jun. 2009).

(Continued)

*Primary Examiner* — Michael P. Rodriguez
(74) *Attorney, Agent, or Firm* — Baker Hughes Patent Operation

(57) ABSTRACT

A silicone bond coat composition having a viscosity of less than 1,600 centistokes is applied to substantially all external surfaces of the article and then cured. A liquid silicone elastomer outer coat composition comprising a high viscosity first liquid silicone elastomer formulation and a low viscosity second liquid silicone elastomer formulation is then applied and cured to provide a protected article having a complex shape. Optimal coatings result from a careful balancing of component viscosities. In an embodiment, the first formulation has a viscosity greater than 300,000 centistokes, and the second formulation has a viscosity less than 6,000 centistokes, and the liquid silicone elastomer outer coat composition comprises from about 60 to about 40 percent by weight of the first formulation and from about 40 to about 60 percent by weight of the second liquid silicone elastomer formulation.

13 Claims, No Drawings

(56) References Cited

U.S. PATENT DOCUMENTS

| | | |
|---|---|---|
| 4,998,706 A | 3/1991 | Hyll |
| 5,562,989 A | 10/1996 | Statz |
| 6,132,808 A | 10/2000 | Brown et al. |
| 6,165,620 A | 12/2000 | Harblin et al. |
| 6,610,407 B1 | 8/2003 | Homi |
| 6,706,405 B2 | 3/2004 | Sanders et al. |
| 7,033,673 B2 | 4/2006 | Wiedemann et al. |
| 7,455,106 B2 | 11/2008 | Veneruso et al. |
| 8,403,639 B2 | 3/2013 | Vedsted et al. |
| 8,501,857 B2 | 8/2013 | Higuchi |
| 8,536,295 B2 | 9/2013 | Blum et al. |
| 8,557,388 B2 | 10/2013 | Hong |
| 2002/0019479 A1* | 2/2002 | Ota .................... G03G 15/2057 524/588 |
| 2004/0225079 A1 | 11/2004 | Wiedemann et al. |
| 2005/0019589 A1 | 1/2005 | Wiedemann et al. |
| 2010/0255289 A1 | 10/2010 | Lewinsohn et al. |
| 2011/0028650 A1 | 2/2011 | Bushelman et al. |
| 2013/0017075 A1 | 1/2013 | Orban et al. |
| 2014/0011935 A1 | 1/2014 | Hong |

FOREIGN PATENT DOCUMENTS

| | | |
|---|---|---|
| EP | 1 529 827 B1 | 12/2007 |
| EP | 2 562 770 A1 | 2/2013 |
| WO | 2004/083348 A2 | 9/2004 |
| WO | 2012/178193 A1 | 12/2012 |
| WO | 2013/082134 A1 | 6/2013 |

OTHER PUBLICATIONS

Lin, S. et al., "Corrosion protection of aluminum alloys and metal matrix composites by polymer coatings," Corrosion Science, vol. 33, Issue 9, pp. 1331-1349 (Sep. 1992).

International Search Report and Written Opinion issued in connection with corresponding PCT Application No. PCT/US2015/063115 dated Mar. 1, 2016.

International Preliminary Report on Patentability issued in connection with corresponding PCT Application No. PCT/US2015/063115 dated Jun. 13, 2017.

* cited by examiner

METHOD OF PROTECTING AN ARTICLE HAVING A COMPLEX SHAPE

BACKGROUND

The present invention provides a method of protecting an article having a complex shape. In particular, the present invention provides a method of protecting articles comprising non-line-of-sight-surfaces requiring protection from the environment.

While a large number of non-line-of-sight compatible coating techniques such as Chemical Vapor Deposition and Electroless Nickel Plating are available for the protection of surfaces within complex structures, such techniques are inapplicable for use with polymeric organic coatings which must rely on the use of non-productive diluents to provide formulations suitable for use in non-line-of-sight compatible coating techniques.

While much ingenuity has gone into the development of state of the art polymer coating technologies, further enhancements are needed as equipment requiring some level of additional protection is deployed in progressively harsher environments.

BRIEF DESCRIPTION

In one embodiment, the present invention provides a method of protecting an article having a complex shape, the method comprising: (a) applying a silicone bond coat composition to substantially all external surfaces of a first article having a complex shape, the silicone bond coat composition having a viscosity of less than 1,600 centistokes; (b) curing the silicone bond coat composition in contact with the external surfaces of the first article to provide a first intermediate article; (c) applying a liquid silicone elastomer outer coat composition comprising a high viscosity first liquid silicone elastomer formulation and a low viscosity second liquid silicone elastomer formulation to substantially all external surfaces of the first intermediate article to provide a second intermediate article; and (d) curing the liquid silicone elastomer outer coat in contact with the external surfaces of the second intermediate article to provide a protected article having a complex shape; wherein the high viscosity first liquid silicone elastomer formulation has a viscosity greater than 300,000 centistokes, wherein the low viscosity second liquid silicone elastomer formulation has a viscosity less than 6,000 centistokes, and wherein the liquid silicone elastomer outer coat composition comprises from about 60 to about 40 percent by weight of the high viscosity first liquid silicone elastomer formulation and from about 40 to about 60 percent by weight of the low viscosity second liquid silicone elastomer formulation.

In an alternate embodiment, the present invention provides a method of protecting an article having a complex shape, the method comprising: (a) applying a silicone bond coat composition to substantially all external surfaces of a first article having a complex shape, the silicone bond coat composition having a viscosity of less than 1,600 centistokes; (b) curing the silicone bond coat composition in contact with the external surfaces of the first article at a temperature in a range from about 80 to about 150 degrees centigrade to provide a first intermediate article; (c) applying a liquid silicone elastomer outer coat composition comprising a first liquid silicone elastomer formulation having a viscosity greater than 300,000 centistokes and a second liquid silicone elastomer formulation having a viscosity less than 6,000 centistokes to substantially all external surfaces of the first intermediate article to provide a second intermediate article; and (d) curing the liquid silicone elastomer outer coat composition in contact with the external surfaces of the second intermediate article at a temperature in a range from about 180 to about 250 degrees centigrade to provide a protected article having a complex shape; wherein the liquid silicone elastomer outer coat composition comprises from about 60 to about 40 percent by weight of the first liquid silicone elastomer formulation and from about 40 to about 60 percent by weight of the second liquid silicone elastomer formulation.

In yet another embodiment, the present invention provides a method of protecting an article having a complex shape, the method comprising: (a) applying via a dip coating technique a silicone bond coat composition to substantially all external surfaces of a first article having a complex shape, the silicone bond coat composition having a viscosity of less than 1,600 centistokes; (b) curing the silicone bond coat composition in contact with the external surfaces of the first article at a temperature in a range from about 80 to about 150 degrees centigrade to provide a first intermediate article; (c) applying via a dip coating technique a liquid silicone elastomer outer coat composition comprising a first liquid silicone elastomer formulation having a viscosity greater than 300,000 centistokes and a second liquid silicone elastomer formulation having a viscosity less than 6,000 centistokes to substantially all external surfaces of the first intermediate article to provide a second intermediate article; and (d) curing the liquid silicone elastomer outer coat composition in contact with the external surfaces of the second intermediate article at a temperature in a range from about 180 to about 250 degrees centigrade to provide a protected article having a complex shape; wherein the liquid silicone elastomer outer coat composition comprises from about 60 to about 40 percent by weight of the first liquid silicone elastomer formulation and from about 40 to about 60 percent by weight of the second liquid silicone elastomer formulation and wherein one or more of the first liquid silicone elastomer formulation and the second liquid silicone elastomer formulation comprises one or more fillers in an amount such that the total amount of filler in the liquid silicone elastomer outer coat composition corresponds to from about 10 to about 30 percent by volume of a total volume of the liquid silicone elastomer outer coat composition.

DETAILED DESCRIPTION

In the following specification and the claims, which follow, reference will be made to a number of terms, which shall be defined to have the following meanings.

The singular forms "a", "an", and "the" include plural referents unless the context clearly dictates otherwise. Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, the present invention provides methods of protecting articles having complex shapes from aggressive environments commonly encountered in human activities such as gas compression, chemical manufacturing and the like. Applying protective coatings to articles having a complex shape is especially challenging when non-line of sight structural features such as non-linear channels and cavities in surfaces remote from a visible surface of the articles. For purposes of the present disclosure, an article having a complex shape is defined as an article having at least one surface feature requiring protection and qualifying as a non-line of sight surface feature are present. A non-line-of-sight surface feature is a surface feature which is not visible along any possible line of sight and yet is in fluid communication with the environment.

It has been discovered that applying, in successive non-line-of-sight compatible techniques such as dip coating, a low viscosity silicone bond coat composition followed by a liquid silicone elastomer outer coat composition having a viscosity carefully balanced between a high viscosity first liquid silicone elastomer formulation and a low viscosity second liquid silicone elastomer formulation affords after curing of the outer coat composition an article in which substantially all of the non-line-of-sight surface features have been protected. Those of ordinary skill in the art will understand that the bond coat may be cured prior to the application of the liquid silicone elastomer outer coat composition.

Articles having complex shapes as defined herein include centrifugal compressor stator casings; gas turbine compressor casings; slurry pump impellers; surface pump components; marine impellers, and drive shafts. In general any system component requiring protection from an aggressive environment may be suitably protected using the method disclosed herein.

In one embodiment, the article to be protected, at times herein referred to as a first article having a complex shape, is a compressor component, such as a compressor guide vane. In an alternate embodiment, the first article having a complex shape is an impeller.

Typically, machine components are constructed from metallic materials such as aluminum and steel and are subject to the deleterious effects of the environment in which the machine must operate. In one or more embodiments, the first article having a complex shape comprises one or more surfaces comprising mild steel, aluminum, copper, and alloys of the foregoing.

As noted, the method provided by the present invention employs a low viscosity silicone bond coat composition which is applied to essentially all of the external surfaces of the article to be protected. In one or more embodiments, the performance of the ultimate bi-layer coating produced may be enhanced by cleaning the surfaces to be coated with an organic solvent, for example acetone, prior to the application of the low viscosity silicone bond coat composition. The silicone bond coat composition is curable and has a viscosity of less than 1,600 centistokes. In one or more embodiments, the silicone bond coat composition has a viscosity in a range from about 500 to about 1,500 centistokes. In one or more embodiments, the silicone bond coat composition cures at a temperature in a range from about 80 to about 150° C. and the cured bond coat has a thickness in a range from about 5 to about 20 microns.

The relatively low viscosity of the silicone bond coat composition facilitates the formation of a thin bond coat layer in relation to the outer coat layer. Immersion techniques, at times herein referred to as dip techniques, may be used for articles having challenging non-line-of-sight surface features. In some embodiments simple spray techniques may be used to coat substantially all external surfaces of articles having complex shapes.

Suitable silicone bond coat compositions are commercially available, for example Momentive Silicones' bond coat products including SS 4044.

As noted, the bond coat is applied to the article to be protected and cured at one or more temperatures in a range from about 80 to about 150° C. to produce an intermediate article at times herein referred to as the first intermediate article. Next, a liquid silicone elastomer outer coat composition is applied using a non-line-of-sight compatible coating technique such as dip coating or a combination of dip coating and spin coating, collectively dip coating techniques. In one or more embodiments, owing to the structure of the article to be coated, the liquid silicone elastomer outer coat composition may be applied using a spray technique or a spray and spin technique, collectively spray techniques.

The liquid silicone elastomer outer coat composition comprises a high viscosity, multi-component first liquid silicone elastomer formulation having a viscosity greater than 300,000 centistokes. The liquid silicone elastomer outer coat composition also comprises a low viscosity, multi-component second liquid silicone elastomer formulation having a viscosity less than 6,000 centistokes. The two formulations combine to provide the liquid silicone elastomer outer coat composition having an appropriate viscosity when the outer coat composition comprises from about 60 to about 40 percent by weight of the high viscosity first liquid silicone elastomer formulation and from about 40 to about 60 percent by weight of the low viscosity second liquid silicone elastomer formulation.

Suitable high viscosity, multi-component first liquid silicone elastomer formulations are available commercially and include Momentive Silicones' LSR2050 product. Suitable low viscosity, multi-component second liquid silicone elastomer formulations are available commercially and include Momentive Silicones' TP3719 product.

The application of the liquid silicone elastomer outer coat composition to substantially all external surfaces of the first intermediate article provides a second intermediate article which is subsequently heated to one or more temperatures in a range from about 180 to about 250 degrees centigrade in order to cure the outer coat composition. Owing to its relatively higher viscosity, the cured outer layer has a thickness a range from about 50 to about 500 microns.

In one or more embodiments, the liquid silicone elastomer outer coat composition may comprise a filler. Suitable fillers are known to those of ordinary skill in the art and include $Al_2O_3$, graphite, $SiO_2$, SiC, $Si_3N_4$, SiCN, WC, $ZrO_2$, and combinations of two or more of the foregoing fillers. In one or more embodiments, the liquid silicone elastomer outer coat composition comprises about 20 by volume of a filler based on a total volume of the liquid silicone elastomer outer coat composition. In one or more embodiments, the filler is characterized by a maximum particle size in a range from about 2 nanometers to about 10 microns.

Surface roughness is thought to play a role in the effectiveness with which the bond coat bonds to the liquid silicone elastomer outer coat composition. In one or more embodiments, the cured bond coat has a surface roughness in a range from about 0.5 to about 1 microns and the cured outer coat has a surface roughness in a range from about 0.5 to about 3 microns.

Experimental Part

A silicone bond coat composition (SS4044), a high viscosity first liquid silicone elastomer formulation and a low viscosity second liquid silicone elastomer formulation (LSR2050 and TP3719) were obtained from Momentive (Waterford, N.Y.). LSR2050 is a two-component high viscosity liquid silicone rubber/elastomer formulation having a nominal viscosity at 20° C. of Pa·s y=10 s$^{-1}$. TP3719 is a two-component low viscosity second liquid silicone elastomer formulation.

Viscosity balancing tests were carried out mixing LSR2050 and TP3719 in varying amounts to create the four-component liquid silicone elastomer outer coat composition having a viscosity suitable for non-line of sight (NLS) coating of an article having a complex shape such as an impeller. Suitable viscosities were achieved when the liquid silicone elastomer outer coat composition comprised from about 60 to about 40 percent by weight of the high viscosity first liquid silicone elastomer formulation LSR2050 and from about 40 to about 60 percent by weight of the low viscosity second liquid silicone elastomer formulation TP3719. In the experiments described herein, the liquid silicone elastomer outer coat composition had a viscosity of about 35,000 centistokes.

Bi-layer coatings were applied to circular coupons for corrosion studies and to rectangular coupons for erosion studies. In order to achieve well adherent coatings, coupon surfaces were cleaned by sonication in acetone and dried. Cleaned coupons were dip coated with the SS4044 bond coat composition and bond coat thickness was maintained between 10-30 µm. The bond coat was cured in air at 100° C. for 1 h to provide a first intermediate test article. The four-component liquid silicone elastomer outer coat composition was prepared by hand mixing equal amounts LSR2050 and TP3719, and was then applied as a 300-500 micron coat over the bond coat by immersion of the first intermediate test article (dip process) in the outer coat composition to provide a second intermediate test article. Fillers, if present, were added to the four-component liquid silicone elastomer outer coat composition in an amount corresponding to about 20 percent by volume of the outer coat composition. The second intermediate test article was then heated to 200° C. to cure the outer coat. This curing process in which the outer coat composition undergoes substantial cross linking was performed with heating and cooling rates of 3° C./min and a holding time of 1 hr at 200° C. in air.

Coated test coupons were subjected to a battery of tests to evaluate coating performance. Scanning microscopy demonstrated good adhesion of the bond coat to the substrate and a defect free outer coat strongly bound to the bond coat.

Coated test coupons exhibited excellent corrosion resistance relative the uncoated test coupons in 5% NaCl at 25° C. In an autoclave immersion test at 80° C. and 50 bar with the test coupon immersed in salt water at pH 3.5, no corrosion of the test coupons was observed after 720 hours. Unfilled systems as well as systems comprising $Al_2O_3$, $ZrO_2$ or WC fillers all exhibited excellent corrosion resistance.

Erosion tests were carried out at room temperature using sand having an average particle size of 250 microns as the erodent at a flow rate of 2.5 grams per minute. Erodent angle of approach was 30 and 90 degrees. Unfilled systems as well as systems comprising $Al_2O_3$, $ZrO_2$ or WC fillers all exhibited excellent erosion resistance which was about ten times the resistance of the uncoated test coupon.

Resistance of the coatings to exposure to hydrocarbons at high pressure and moderate temperature was demonstrated using a pressure vessel equipped with a gold plated test coupon holding cell. In a first test, coated test coupons were exposed to a mixture of methane (70%) and carbon dioxide (30%) at 10 bar and 80° C. for 100 hours. In a second test, coated test coupons were immersed in 1% salt solution adjusted to pH 3.5 with hydrochloric acid in a pressure vessel. The vessel was purged with a mixture of methane (70%) and carbon dioxide (30%) and then held at 10 bar and 80° C. for 100 hours. No visible degradation of the coatings was observed in either test. Filled and unfilled systems gave similar results.

Finally, the coated test coupons exhibited good strain tolerance in a four point bending test. No cracks in the coatings were observed after being subjected to 3.2% strain.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of protecting an article having a complex shape, the method comprising:

applying a silicone bond coat composition to substantially all external surfaces of a first article having a complex shape, the silicone bond coat composition having a viscosity of less than 1,600 centistokes;

curing the silicone bond coat composition in contact with the external surfaces of the first article to provide a first intermediate article;

applying a liquid silicone elastomer outer coat composition comprising a high viscosity first liquid silicone elastomer formulation and a low viscosity second liquid silicone elastomer formulation to substantially all external surfaces of the first intermediate article to provide a second intermediate article, wherein the high viscosity first liquid silicone elastomer formulation has a viscosity greater than 300,000 centistokes, wherein the low viscosity second liquid silicone elastomer formulation has a viscosity less than 6,000 centistokes; and curing the liquid silicone elastomer outer coat in contact with the external surfaces of the second intermediate article to provide a protected article having a complex shape, wherein the liquid silicone elastomer outer coat composition comprises form about 60 to about 40 percent by weight of the high viscosity first liquid silicone elastomer formulation and from about 40 to about 60 percent by weight of the low viscosity second liquid silicone elastomer formulation;

wherein the article having a complex shape is selected from the group consisting of centrifugal compressor stator casings, gas turbine compressor casings, slurry pump impellers, surface pump components, marine impellers, drive shafts, compressor components, and impellers.

2. The method according to claim 1, wherein the first article having a complex shape comprises one or more surfaces comprising mild steel, aluminum, copper, and alloys of the foregoing.

3. The method according to claim 1, wherein curing the silicone bond coat composition in contact with the external surfaces to provide a first intermediate article comprises heating to a temperature in a range from about 80 to about 150 degrees centigrade.

4. The method according to claim 1, wherein curing the liquid silicone elastomer outer coat composition in contact with the external surfaces of the second intermediate article to provide a protected article having a complex shape comprises heating to a temperature in a range from about 180 to about 250 degrees centigrade.

5. The method according to claim 1, wherein the liquid silicone elastomer outer coat composition comprises a filler in an amount corresponding to from about 1 to about 20 percent of a total volume of the outer coat composition.

6. The method according to claim 5, wherein the filler is characterized by a maximum particle size in a range from about 2 nanometers to about 10 microns.

7. The method according to claim 1, wherein a cured bond coat has a thickness in a range from about 5 to about 20 microns and a cured outer coat has a thickness in a range from about 50 to about 500 microns.

8. The method according to claim 1, wherein a cured bond coat has a surface roughness in a range from about 0.5 to about 1 microns and a cured outer coat has a surface roughness in a range from about 0.5 to about 3 microns.

9. The method according to claim 1 further comprising a step of cleaning the first article having a complex shape with an organic solvent.

10. The method according to claim 1, wherein the bond coat composition is applied via a spray coating technique.

11. The method according to claim 1, wherein the bond coat composition is applied via a dip coating technique.

12. The method according to claim 1, wherein the liquid silicone elastomer outer coat composition is applied via a spray coating technique.

13. The method according to claim 1, wherein the liquid silicone elastomer outer coat composition is applied via a dip coating technique.

\* \* \* \* \*